(12) United States Patent
Baratakke et al.

(10) Patent No.: US 7,734,812 B2
(45) Date of Patent: Jun. 8, 2010

(54) METHOD AND APPARATUS FOR PROCESSING OUTGOING INTERNET PROTOCOL PACKETS

(75) Inventors: Kavitha Vittal Murthy Baratakke, Austin, TX (US); Deanna Lynn Quigg Brown, Pflugerville, TX (US); Jeffrey Paul Messing, Austin, TX (US); Venkat Venkatsubra, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 2067 days.

(21) Appl. No.: 10/165,084

(22) Filed: Jun. 6, 2002

(65) Prior Publication Data
US 2003/0229715 A1 Dec. 11, 2003

(51) Int. Cl.
G06F 15/16 (2006.01)
G06F 15/173 (2006.01)

(52) U.S. Cl. ........................ 709/238; 709/245

(58) Field of Classification Search ......... 709/230–246, 709/201–203, 217–219, 227–228; 370/428
See application file for complete search history.

(56) References Cited

U.S. PATENT DOCUMENTS

| | | | | |
|---|---|---|---|---|
| 5,179,558 A * | 1/1993 | Thacker et al. | ............. | 370/406 |
| 5,321,696 A * | 6/1994 | Buchholz et al. | ............. | 370/312 |
| 5,568,477 A * | 10/1996 | Galand et al. | ............. | 370/229 |
| 6,011,795 A * | 1/2000 | Varghese et al. | ............. | 370/392 |
| 6,216,167 B1 * | 4/2001 | Momirov | ............. | 709/238 |
| 6,260,072 B1 * | 7/2001 | Rodriguez-Moral | ........ | 709/241 |
| 6,310,875 B1 * | 10/2001 | Nichols et al. | ............. | 370/388 |
| 6,356,951 B1 * | 3/2002 | Gentry, Jr. | ............. | 709/250 |
| 6,567,417 B2 * | 5/2003 | Kalkunte et al. | ............. | 370/428 |
| 6,577,630 B1 * | 6/2003 | Markwalter et al. | ......... | 370/392 |
| 6,775,258 B1 * | 8/2004 | van Valkenburg et al. | ... | 370/338 |
| 6,839,347 B1 * | 1/2005 | Ishida et al. | ................ | 370/389 |
| 6,996,099 B1 * | 2/2006 | Kadambi et al. | ............ | 370/389 |
| 7,020,139 B2 * | 3/2006 | Kalkunte et al. | ............. | 370/392 |
| 7,120,683 B2 * | 10/2006 | Huang | ......................... | 709/223 |
| 7,310,335 B1 * | 12/2007 | Garcia-Luna-Aceves et al. | ........... | 370/390 |
| 7,315,552 B2 * | 1/2008 | Kalkunte et al. | ............. | 370/428 |
| 7,327,683 B2 * | 2/2008 | Ogier et al. | ................ | 370/236 |
| 7,352,764 B1 * | 4/2008 | Park et al. | ................... | 370/412 |
| 7,352,770 B1 * | 4/2008 | Yonge et al. | ................ | 370/445 |
| 7,366,208 B2 * | 4/2008 | Bowes | ........................ | 370/535 |
| 7,469,297 B1 * | 12/2008 | Kostoff et al. | .............. | 709/236 |
| 7,539,134 B1 * | 5/2009 | Bowes | ........................ | 370/230 |
| 7,590,116 B2 * | 9/2009 | He et al. | ..................... | 370/392 |

(Continued)

OTHER PUBLICATIONS

RFC 988.*

(Continued)

*Primary Examiner*—Asad M Nawaz
(74) *Attorney, Agent, or Firm*—Yee & Associates, P.C.; Diana R. Gerhardt

(57) ABSTRACT

A method, apparatus, and computer instructions for processing packets in a network layer. A packet is received for transmission in which the packet includes a destination address. A routing entry for the destination address is identified. A determination is made as to whether a flag indicating the packet is to be broadcast has been set in the routing entry. Header information is placed in the packet in which the header information indicates that the packet is a broadcast packet in response to the flag being set.

26 Claims, 3 Drawing Sheets

U.S. PATENT DOCUMENTS

| | | | | |
|---|---|---|---|---|
| 2001/0034793 A1* | 10/2001 | Madruga et al. | | 709/238 |
| 2001/0037378 A1* | 11/2001 | Hirayama | | 709/219 |
| 2002/0012320 A1* | 1/2002 | Ogier et al. | | 370/252 |
| 2002/0018480 A1* | 2/2002 | Galicki et al. | | 370/401 |
| 2003/0033394 A1* | 2/2003 | Stine | | 709/222 |
| 2003/0115345 A1* | 6/2003 | Chien et al. | | 709/229 |
| 2003/0174719 A1* | 9/2003 | Sampath et al. | | 370/402 |
| 2003/0179742 A1* | 9/2003 | Ogier et al. | | 370/351 |
| 2004/0128351 A1* | 7/2004 | Hoogland et al. | | 709/204 |
| 2005/0262005 A1* | 11/2005 | Woolston | | 705/37 |
| 2006/0069718 A1* | 3/2006 | Hirayama | | 709/203 |
| 2006/0251085 A1* | 11/2006 | Kalkunte et al. | | 370/400 |
| 2008/0151808 A1* | 6/2008 | O'Neill | | 370/312 |
| 2008/0175265 A1* | 7/2008 | Yonge et al. | | 370/447 |
| 2008/0250104 A1* | 10/2008 | Hirayama | | 709/203 |
| 2009/0006276 A1* | 1/2009 | Woolston et al. | | 705/400 |

OTHER PUBLICATIONS

RFC 1112.*
RFC 1812.*
RFC3376.*
RFC 2236.*
RFC 1122.*
RFC 1054.*

\* cited by examiner

METHOD AND APPARATUS FOR PROCESSING OUTGOING INTERNET PROTOCOL PACKETS

BACKGROUND OF THE INVENTION

1. Technical Field

The present invention relates generally to an improved data processing system, and in particular, to a method and apparatus for processing data. Still more particularly, the present invention provides a method and apparatus for processing outgoing Internet protocol packets.

2. Description of Related Art

The Internet, also referred to as an "internetwork", is a set of computer networks, possibly dissimilar, joined together by means of gateways that handle data transfer and the conversion of messages from a protocol of the sending network to a protocol used by the receiving network. When capitalized, the term "Internet" refers to the collection of networks and gateways that use the Transmission Control Protocol/Internet Protocol (TCP/IP) suite of protocols.

Currently, the most commonly employed method of transferring data over the Internet is to employ the World Wide Web environment, also called simply "the Web". Other Internet resources exist for transferring information, such as File Transfer Protocol (FTP) and Gopher, but have not achieved the popularity of the Web. In the Web environment, servers and clients effect data transaction using the Hypertext Transfer Protocol (HTTP), a known protocol for handling the transfer of various data files (e.g., text, still graphic images, audio, motion video, etc.). The information in various data files is formatted for presentation to a user by a standard page description language, the Hypertext Markup Language (HTML). In addition to basic presentation formatting, HTML allows developers to specify "links" to other Web resources identified by a Uniform Resource Locator (URL). A URL is a special syntax identifier defining a communications path to specific information. Each logical block of information accessible to a client, called a "page" or a "Web page", is identified by a URL. The URL provides a universal, consistent method for finding and accessing this information, not necessarily for the user, but mostly for the user's Web "browser". A browser is a program capable of submitting a request for information identified by an identifier, such as, for example, a URL.

The protocol used in transferring data over the Internet is called Transmission Control Protocol/Internet Protocol (TCP/IP). TCP provides transport functions, which ensures that the total amount of bytes sent is received correctly at the other end. TCP/IP is a routable protocol, and the IP part of TCP/IP provides this capability. In a routable protocol, all messages contain not only the address of the destination station, but the address of a destination network. This allows TCP/IP messages to be sent to multiple networks (subnets) within an organization or around the world, hence its use in the worldwide Internet. Every client and server in a TCP/IP network requires an IP address, which is either permanently assigned or dynamically assigned at startup. This protocol is also often used in other types of network data processing systems, such as, local area networks, wide area networks, and intranets, to direct messages between different data processing systems or nodes.

In some cases, messages may be broadcast to everyone on a network or network segment. These types of messages are also referred to as "broadcast traffic". In a network, broadcast traffic is the message traffic that is sent out to everybody on a network segment. Broadcasts are issued for address resolution when the location of a user or server is not known. This type of traffic may occur, for example, when clients and servers come online and identify themselves. Sometimes, network devices continually announce their presence. In all cases, the broadcast has to reach all possible networks and stations that might potentially respond.

Currently, the processing of packets to verify whether the destination IP address is a broadcast address occurs with every outgoing packet. Some of the steps involved in verifying whether a destination IP address is a broadcast address are expensive with respect to resources in a data processing system. Typically, the process involves checking to see whether the destination IP address is one of a set of different kinds of broadcast addresses, such as, for example, 255.255.255.255 or 0.0.0.0. Another check made is to determine whether the destination IP address is a subnet broadcast address, such as, for example, addresses in which the host part of the address is all zeros. The processing in which checks are made to see whether a destination IP address is a subnet broadcast address becomes expensive with respect to resources in a data processing system when the outgoing interface contains many IP aliases. Further, on a multiprocessor system, a lock on the interface is often required to perform the verification steps. In other words, all outgoing traffic must wait for the interface to be released before other packets can be verified. This lock may form a bottleneck for pseudo devices such as an Ether channel in which multiple adapters are assigned to a single IP interface.

Therefore, it would be advantageous to have an improved method, apparatus, and computer instructions for processing outgoing IP packets in a data processing system.

SUMMARY OF THE INVENTION

The present invention provides a method, apparatus, and computer instructions for processing packets in a network layer. A packet is received for transmission in which the packet includes a destination address. A routing entry for the destination address is identified. A determination is made as to whether a flag indicating the packet is to be broadcast has been set in the routing entry. Header information is placed in the packet in which the header information indicates that the packet is a broadcast packet in response to the flag being set.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
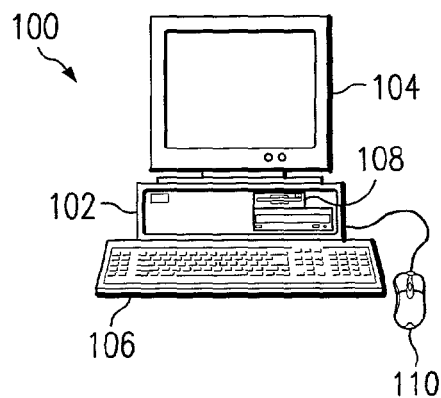
FIG. 1 is a pictorial representation of a data processing system in which the present invention may be implemented in accordance with a preferred embodiment of the present invention.

With reference now to the figures and in particular with reference to FIG. 1, a pictorial representation of a data processing system in which the present invention may be implemented is depicted in accordance with a preferred embodiment of the present invention. A computer 100 is depicted which includes system unit 102, video display terminal 104, keyboard 106, storage devices 108, which may include floppy drives and other types of permanent and removable storage media, and mouse 110. Additional input devices may be included with personal computer 100, such as, for example, a joystick, touchpad, touch screen, trackball, microphone, and the like. Computer 100 can be implemented using any suitable computer, such as an IBM eServer computer or IntelliStation computer, which are products of International Business Machines Corporation, located in Armonk, N.Y. Although the depicted representation shows a computer, other embodiments of the present invention may be implemented in other types of data processing systems, such as a network computer. Computer 100 also preferably includes a graphical user interface (GUI) that may be implemented by means of systems software residing in computer readable media in operation within computer 100.

Figure 2:
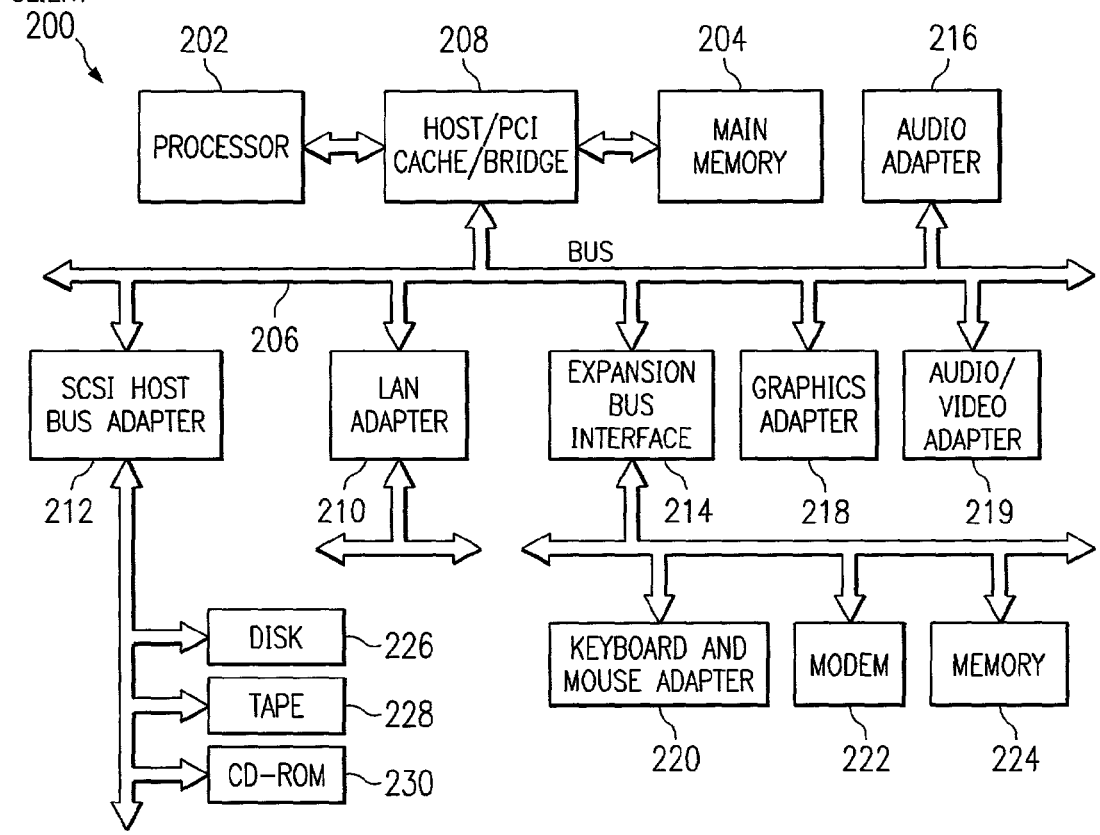
FIG. 2 is a block diagram of a data processing system in which the present invention may be implemented.

With reference now to FIG. 2, a block diagram of a data processing system is shown in which the present invention may be implemented. Data processing system 200 is an example of a computer, such as computer 100 in FIG. 1, in which code or instructions implementing the processes of the present invention may be located. Data processing system 200 employs a peripheral component interconnect (PCI) local bus architecture. Although the depicted example employs a PCI bus, other bus architectures such as Accelerated Graphics Port (AGP) and Industry Standard Architecture (ISA) may be used. Processor 202 and main memory 204 are connected to PCI local bus 206 through PCI bridge 208. PCI bridge 208 also may include an integrated memory controller and cache memory for processor 202. Additional connections to PCI local bus 206 may be made through direct component interconnection or through add-in boards. In the depicted example, local area network (LAN) adapter 210, small computer system interface SCSI host bus adapter 212, and expansion bus interface 214 are connected to PCI local bus 206 by direct component connection.

In contrast, audio adapter 216, graphics adapter 218, and audio/video adapter 219 are connected to PCI local bus 206 by add-in boards inserted into expansion slots. Expansion bus interface 214 provides a connection for a keyboard and mouse adapter 220, modem 222, and additional memory 224. SCSI host bus adapter 212 provides a connection for hard disk drive 226, tape drive 228, and CD-ROM drive 230. Typical PCI local bus implementations will support three or four PCI expansion slots or add-in connectors.

An operating system runs on processor 202 and is used to coordinate and provide control of various components within data processing system 200 in FIG. 2. The operating system may be a commercially available operating system such as Windows XP, which is available from Microsoft Corporation. Instructions for the operating system and applications or programs are located on storage devices, such as hard disk drive 226, and may be loaded into main memory 204 for execution by processor 202.

Those of ordinary skill in the art will appreciate that the hardware in FIG. 2 may vary depending on the implementation. Other internal hardware or peripheral devices, such as flash read-only memory (ROM), equivalent non-volatile memory, or optical disk drives and the like, may be used in addition to or in place of the hardware depicted in FIG. 2. Also, the processes of the present invention may be applied to a multiprocessor data processing system.

For example, data processing system 200, if optionally configured as a network computer, may not include SCSI host bus adapter 212, hard disk drive 226, tape drive 228, and CD-ROM 230. In that case, the computer, to be properly called a client computer, includes some type of network communication interface, such as LAN adapter 210, modem 222, or the like. As another example, data processing system 200 may be a stand-alone system configured to be bootable without relying on some type of network communication interface, whether or not data processing system 200 comprises some type of network communication interface. As a further example, data processing system 200 may be a personal digital assistant (PDA), which is configured with ROM and/or flash ROM to provide non-volatile memory for storing operating system files and/or user-generated data.

The depicted example in FIG. 2 and above-described examples are not meant to imply architectural limitations. For example, data processing system 200 also may be a notebook computer or hand held computer in addition to taking the form of a PDA. Data processing system 200 also may be a kiosk or a Web appliance. The processes of the present invention are performed by processor 202 using computer implemented instructions, which may be located in a memory such as, for example, main memory 204, memory 224, or in one or more peripheral devices 226-230.

Figure 3:
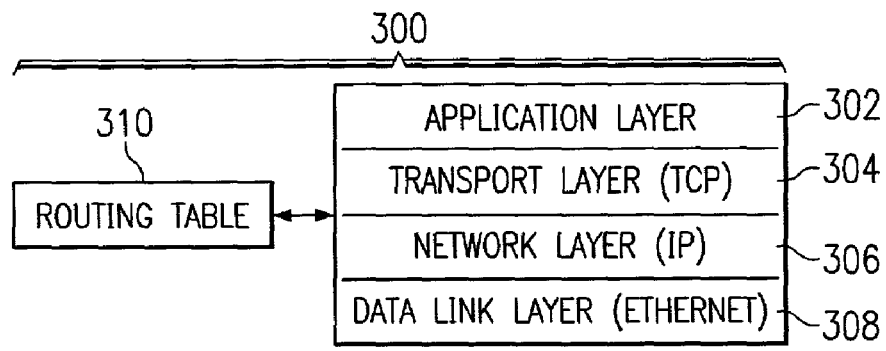
FIG. 3 is a diagram illustrating components used in generating and processing outgoing packets in accordance with a preferred embodiment of the present invention.

Turning now to FIG. 3, a diagram illustrating components used in generating and processing outgoing packets is depicted in accordance with a preferred embodiment of the present invention. In this example, protocol stack 300 includes application layer 302, transport layer 304, network layer 306, and data link layer 308. Protocol stack 300 includes layers for a TCP/IP protocol stack in these examples.

Application layer 302 is the top layer of the protocol stack in this example. This application layer may include protocols for mail, file transfer, node access, authentication, and name resolution. Typically, these protocols are embedded in programs that operate within application layer 302. Transport layer 304 contains the transfer control protocol, which is used to establish a connection between two data processing systems. This layer partially fills an IP header before sending or handing the packet over to network layer 306. Specifically, the destination IP addresses are filled in the packet as well as a TCP header and TCP data. Transport layer 304 also maintains a pointer to a routing entry because the destination is fixed for a connection oriented protocol, such as TCP. This pointer is passed to network layer 306 such that network layer 306 does not have to perform a routing table lookup for every outgoing packet.

Network layer 306 contains the Internet protocol and accepts packets from transport layer 304 and prepares the packets for transmission by data link layer 308. In particular, network layer 306 will add link level header information to the header of the packet as well as place data into the packet. Network layer 306 turns IP addresses into physical station addresses and fragments the packets, if necessary, into a required frame size.

Data link layer 308 includes the Ethernet as a data link protocol or network access method. This layer receives packets from network layer 306 and sends the data onto the physical media used to transport the data to another device or node.

The processes of the present invention are embodied within network layer 306 and in particular in the Internet protocol in this layer. The mechanism of the present invention checks to see whether a destination IP address received in a packet from transport layer 304 is one of a set of broadcast addresses, such as 255.255.255.255 or 0.0.0.0. With respect to subnet broadcast addresses, the mechanism of the present invention does not compare the destination IP address with all possible IP aliases defined in the data processing system. These IP addresses may range from two to three or to hundreds or thousands of addresses. The mechanism of the present invention avoids making this comparison on a per packet basis through the use of a set of flags within routing table 310. This table contains information used by network layer 306 to generate routing information that is placed into the header of a packet. Entries within routing table 310 are identified through pointers received from transport layer 304. During the time that a connection is set up, transport layer 304 performs a lookup in routing table 310. This lookup is to identify the entry for the destination address with which a connection is being set up. This lookup is performed only once during the life of the connection. Transport layer 304 saves the pointer to this entry in a protocol control block. These entries are created when an IP address is configured on a system or when a subnet mask is assigned to a system.

Instead, when an IP interface is configured, a route within routing table 310 may be created with a flag set for RTF_BROADCAST and a flag set for RTF_HOST for a destination to indicate that the destination for this route entry is for a subnet broadcast address. Now, network layer 306 only needs to check these flags to determine whether the packet is a broadcast packet, which is a packet that is to be broadcast, rather than sent to a particular node. The RTF_BROADCAST flag is checked to test the packet to see whether the packet is to be broadcast. The RTF_HOST flag is checked to see whether the matched route entry is an interface route. An example of these tests are shown below in the pseudocode:

```
if (RTF_HOST is set) {
            if (RTF_BROADCAST is set) {
                (A) destination is broadcast
            } else {
                (B) destination is unicast
            }
} else {
            /* it could be an interface route */
            (E) if (dest_address equals dest_addr in
            routing entry) {
                (C) destination is broadcast
            } else {
                (D) destination is not broadcast
            }
}
```

As can be seen from this example, which is written in C language, the RTF_HOST flag is set and later checked to speed up the common case in which the destination is a unicast. The destination comparison is avoided by checking this flag.

In the case that the routing entry may be pointing to an interface route, which occurs when the RTF_BROADCAST flag is not set, the destination IP address in the packet may be compared with the destination address in the routing entry. By keeping this type of broadcast information in the routing entry, the mechanism of the present invention takes advantage of the fact that this entry is needed to process the outgoing IP packet.

Figure 4:
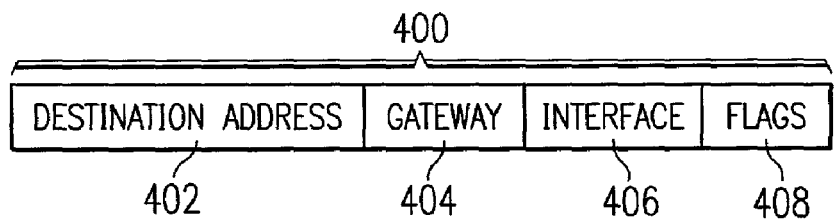
FIG. 4 is a diagram illustrating an example of a routing entry in accordance with a preferred embodiment of the present invention.

With reference now to FIG. 4, a diagram illustrating an example of a routing entry is depicted in accordance with a preferred embodiment of the present invention. Route entry 400 is an example of a route entry contained in routing table 310 in FIG. 3. Route entry 400 includes destination address 402, gateway 404, interface 406, and flags 408. Destination address 402 is the IP address of the destination for the route. The destination address in the entry may differ from that of the packet. The destination in the routing entry may have a subnet address to which the packet's destination belongs. For example, the routing entry may be 1.2.3.0 in which the subnet mask is 255.255.255.0 and the packet's destination address may be 1.2.3.4. Gateway 404 contains the address of a gateway, if one is used, to transport the packet. Interface 406 contains the name of the device. Flags 408 contain various flags, including RTF_BROADCAST and RTF_HOST.

Figure 5:
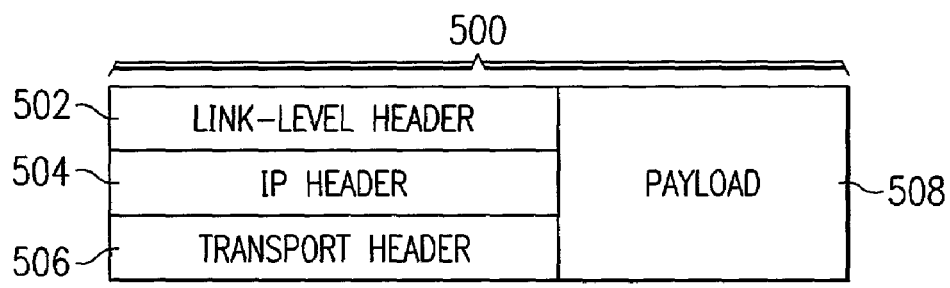
FIG. 5 is a diagram illustrating a packet in accordance with a preferred embodiment of the present invention.

Turning now to FIG. 5, a diagram illustrating a packet is depicted in accordance with a preferred embodiment of the present invention. Packet 500 illustrates a packet processed by the mechanism of the present invention. In this example, packet 500 includes link level header 502, IP header 504, and TCP header 506. Additionally, packet 500 includes payload 508, which contains data being transmitted. TCP header 506 is filled by transport layer 304, in FIG. 3, as well as a portion of IP header 504. Transport layer 304 places a destination IP address into IP header 504. Transport layer 304, in FIG. 3, only partially fills IP header 504. Examples of other portions of IP header 504 that are unfilled include, for example, a 16 bit IP ID, a 13 bit IP fragment IP offset, a 16 bit IP header checksum, a source IP address, a 4 bit IP version, and a 4 bit header length. Link level header 502 is filled by network layer 306 in FIG. 3. The particular information placed into link level header 502 depends in part as to whether the packet is a broadcast packet.

Figure 6:
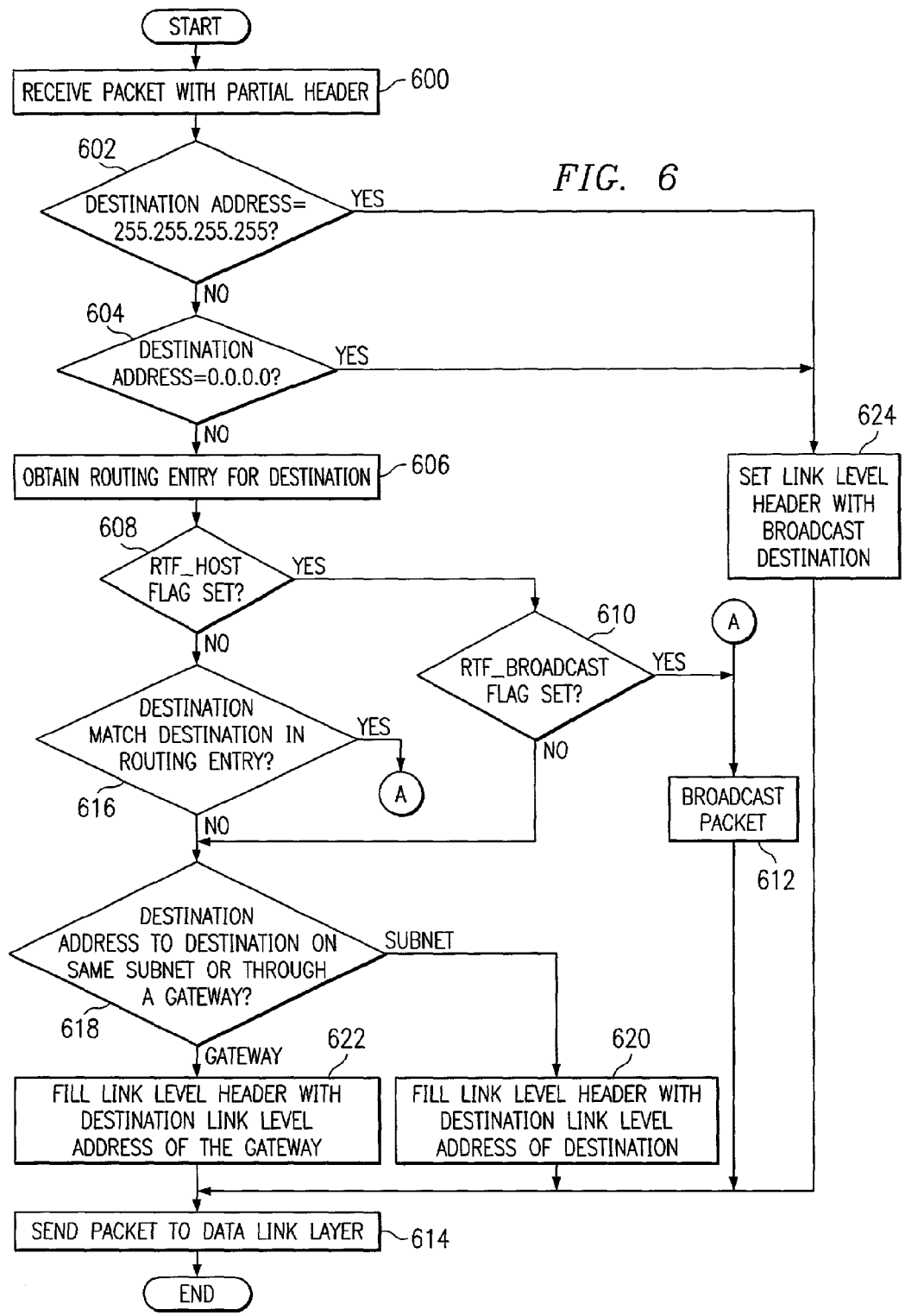
FIG. 6 is a flowchart of a process used for processing packets in accordance with a preferred embodiment of the present invention.

With reference now to FIG. 6, a flowchart of a process used for processing packets is depicted in accordance with a preferred embodiment of the present invention. The process illustrated in FIG. 6 may be implemented in a network layer, such as network layer 306 in FIG. 3.

The process begins by receiving a packet with a partial header (step 600). The packet is received by network layer 306, in FIG. 3, through the reception of a pointer to the memory address in which the packet is located. In this example, the partial header includes the IP destination address as well as TCP header information, such as that illustrated in packet 500 in FIG. 5. A determination is then made as to whether the destination address is 255.255.255.255 (step 602). If the destination address is not 255.255.255.255, a determination is made as to whether the destination address is 0.0.0.0 (step 604). Steps 602 and 604 check to see whether the destination address is an address from a set of broadcast addresses. Of course, these additional steps may be used to check for other types of broadcast addresses other than those presented in these examples.

If the destination address is not 0.0.0.0, the routing entry for the destination is obtained (step 606). The routing entry is obtained from a pointer received along with the packet from the transport layer.

Next, a determination is made as to whether the RTF_Host flag is set (step 608). This flag is used to speed up checking for the case in which the destination is unicast. If the RTF_Host flag is set, a determination is made as to whether the RTF_BROADCAST flag is set (step 610). This flag indicates whether the destination is a broadcast destination or a unicast destination. If the flag is not set, the destination is unicast. If the RTF_BROADCAST flag is set, the packet is broadcast (step 612). The packet is broadcast by setting the destination to some value, such as, for example, 0xffffffffffff, which indicates to an adapter that the packet is a broadcast packet. Thereafter, the packet is sent to the data link layer (step 614) and the process terminates thereafter.

With reference again to step 608, if the RTF_HOST flag is not set, a determination is made as to whether the destination in the packet matches a destination in the routing entry (step 616). If a match is present, this routing entry represents an interface route, which may take the form of, for example, 1.2.3.0. As a result, the process returns to step 612 to broadcast the packet.

Otherwise, a determination is made as to whether the destination address is to a destination on the same subnet as the data processing system or reached through a gateway (step 618). The determination made in step 618 is performed by checking a flag called RTF_GATEWAY, which is a presently used flag. This flag is tested to determine if the destination is on the same subnet or the destination requires passage through a gateway. If the flag is not set, the destination is on the same subnet. If the flag is set, the destination is through a gateway and requires forwarding this packet to the gateway. If the destination is on the same subnet, the link level header is filled with the destination link level address of the destination (step 620) with the process then proceeding to step 614 as described above.

Referring again to step 618, if the destination address is to a gateway, the link level header is filled with the destination link level address of the gateway (step 622) with the process then proceeding to step 614 as described above.

With reference again to step 610, if the RTF_BROADCAST flag is not set, the process proceeds to step 618 as described above. With reference again to step 604, if the destination address is 0.0.0.0, the process proceeds to set link level header with broadcast destination (step 624). With reference again to step 602, if the destination address is 255.255.255.255, the process also proceeds to step 624, as described above.

The determinations made in steps 602, 604, and 618 are steps currently implemented in processing packets. The additional determinations described in steps 608, 610, and 616, are ones added by the present invention to reduce the amount of processing needed for each packet that is to be transmitted.

Thus, the present invention provides an improved method, apparatus, and computer instructions for routing packets. Specifically, the mechanism of the present invention reduces the amount of processing required on outgoing packets. Specifically, checks made to determine whether a destination is on the same subnet or if the destination is reached through a gateway are avoided through the use of flags added to a routing table entry. This routing table entry is already supplied to the network layer by the transport layer. The mechanism of the present invention uses flag fields to determine whether a packet should be broadcast. Further, by reducing the processing time required for packets, bottlenecks that occur with pseudo devices such as an Ether channel are reduced or minimized.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. For example, the processing of packets described above are those specifically related to IP packets. The process of the present invention also could be implemented in other types of routable protocols other than the Internet protocol. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method in a data processing system for processing packets, the method comprising:
    receiving a packet for transmission, wherein the packet includes a destination address;
    identifying a routing entry for the destination address;
    determining whether a flag indicating the packet is to be broadcast has been set in the routing entry; and
    responsive to the flag being set, placing header information in the packet, wherein the header information indicates that the packet is a broadcast packet.

2. The method of claim 1 further comprising:
    transmitting the broadcast packet.

3. The method of claim 1, wherein the broadcast packet is transmitted by sending the broadcast packet to a data link layer.

4. The method of claim 3, wherein the data link layer is an Ethernet layer.

5. The method of claim 1, wherein the receiving step, the identifying step, the determining step, and the placing step are performed in a transport layer.

6. The method of claim 5, wherein the transport layer is an Internet Protocol layer.

7. The method of claim 1, wherein the header information is a link level header in the packet.

8. The method of claim 1 further comprising:
    determining a host flag is unset in the routing entry;
    responsive to the host flag being unset in the routing entry, determining whether the destination is on of a same subnet;
    responsive to the host flag being unset in the routing entry, determining whether the destination is reached through a gateway;
    responsive to the destination being on the same subnet, setting a link level header with an address for the destination; and
    responsive to the destination being reached through a gateway, setting the link level header with an address for the gateway.

9. The method of claim 1 further comprising:
    responsive to the flag being unset in the routing entry, determining whether the destination is on a same subnet;

responsive to the flag being unset in the routing entry, determining whether the destination is reached through a gateway;

responsive to the destination being on the same subnet, setting a link level header with an address for the destination; and responsive to the destination being reached through a gateway, setting the link level header with an address for the gateway.

10. The method of claim 1, wherein the flag is a broadcast flag.

11. The method of claim 10, wherein a host flag also is present in the routing entry and further comprising:

prior to determining whether the broadcast flag is set, determining whether the host flag is set;

responsive to the host flag being unset, determining whether the destination in the routing entry matches the destination address; and responsive to a match between the destination in the routing entry and the destination address, broadcasting the packet.

12. The method of claim 1, wherein the destination address is an Internet Protocol address.

13. A data processing for processing packets in a network layer, the data processing system comprising:

a bus system;

a communications unit connected to the bus system;

a memory connected to the bus system, wherein the memory includes a set of instructions; and a processing unit connected to the bus system, wherein the processing unit executes the set of instructions to receive a packet for transmission in which the packet includes a destination address; identify a routing entry for the destination address; determine whether a flag indicating the packet is to be broadcast has been set in the routing entry; and plane header information in the packet in which the header information indicates that the packet is a broadcast packet in response to the flag being set.

14. A data processing system for processing packets, the data processing system comprising:

receiving means for receiving a packet for transmission, wherein the packet includes a destination address;

identifying means for identifying a routing entry for the destination address;

determining means for determining whether a flag indicating the packet is to be broadcast has been set in the routing entry; and placing means, responsive to the flag being set, for placing header information in the packet, wherein the header information indicates that the packet is a broadcast packet.

15. The data processing system of claim 14 further comprising:

transmitting means for transmitting the broadcast packet.

16. The data processing system of claim 14, wherein the broadcast packet is transmitted by sending the broadcast packet to a data link layer.

17. The data processing system of claim 16, wherein the data link layer is an Ethernet layer.

18. The data processing system of claim 14, wherein the receiving means, the identifying means, the determining means, and the placing means are located in a transport layer.

19. The data processing system of claim 18, wherein the transport layer is an Internet Protocol layer.

20. The data processing system of claim 14, wherein the header information is a link level header in the packet.

21. The data processing system of claim 14, wherein the determining means is a first determining means and further comprising:

second determining means for determining a host flag is unset in the routing entry;

third determining means, responsive to the host flag being unset in the routing entry, for determining whether the destination is on a same subnet;

fourth determining means, responsive to the host flag being unset in the routing entry, for determining whether the destination is reached through a gateway;

first setting means, responsive to the destination being on the same subnet, for setting a link level header with an address fix the destination; and second setting means, responsive to the destination being reached through a gateway, for setting the link level header with an address for the gateway.

22. The method of claim 14 further wherein the determining means is a first determining means and comprising:

second determining means, responsive to the flag being unset in the routing entry, for determining whether the destination is on a same subnet;

third determining means, responsive to the flag being unset in the routing entry, for determining whether the destination is reached through a gateway;

first setting means, responsive to the destination being on the same subnet, for setting a link level header with an address for the destination; and second setting means, responsive to the destination being reached through a gateway, for setting the link level header with an address for the gateway.

23. The data processing system of claim 14, wherein the flag is a broadcast flag.

24. The data processing system of claim 23, wherein the determining means is a first determining means and wherein a host flag also is present in the routing entry and further comprising:

second determining means, prior to determining whether the broadcast flag is set, for determining whether the boat flag is set;

third determining means, responsive to the host flag being unset, for determining whether the destination in the routing entry matches the destination address; and broadcasting means, responsive to a match between the destination in the routing entry and the destination address, for broadcasting the packet.

25. The data processing system of claim 14, wherein the destination address is an Internet Protocol address.

26. A tangible computer storage medium comprising a computer program product for processing packets in a network layer, the computer program product comprising:

first instructions for receiving a packet for transmission, wherein the packet includes a destination address;

second instructions for identifying a routing entry for the destination address;

third instructions for determining whether a flag indicating the packet is to be broadcast has been set in the routing entry;

and fourth instructions, responsive to the flag being set, for placing header information in the packet, wherein the header information indicates that the packet is a broadcast packet.

* * * * *